(12) United States Patent
Watanabe et al.

(10) Patent No.: US 6,744,016 B2
(45) Date of Patent: Jun. 1, 2004

(54) CERAMIC HEATER AND METHOD FOR MANUFACTURING THE SAME

(75) Inventors: Shindo Watanabe, Aichi (JP); Masahiro Konishi, Aichi (JP)

(73) Assignee: NGK Spark Plug Co., Ltd., Nagoya (JP)

( * ) Notice: Subject to any disclaimer, the term of this patent is extended or adjusted under 35 U.S.C. 154(b) by 0 days.

(21) Appl. No.: 09/813,689

(22) Filed: Mar. 21, 2001

(65) Prior Publication Data

US 2001/0054610 A1 Dec. 27, 2001

(30) Foreign Application Priority Data

Mar. 23, 2000 (JP) ........................................ 2000-082019

(51) Int. Cl.⁷ ................................................ F23Q 7/00
(52) U.S. Cl. .................... 219/270; 219/544; 123/145 A
(58) Field of Search ................................ 219/270, 544, 219/553; 123/145 A, 145 R; 501/97.1–97.4

(56) References Cited

U.S. PATENT DOCUMENTS

| | | | | |
|---|---|---|---|---|
| 4,312,899 A | * | 1/1982 | Lahmann | 428/446 |
| 4,535,063 A | * | 8/1985 | Matsuhiro et al. | 501/97.3 |
| 4,929,813 A | | 5/1990 | Masaka et al. | |
| 5,081,079 A | * | 1/1992 | Ukyo et al. | 501/97 |
| 5,750,958 A | | 5/1998 | Okuda et al. | |
| 5,804,523 A | * | 9/1998 | Oda et al. | 501/97.2 |
| 5,993,722 A | | 11/1999 | Radmacher | |
| 6,204,481 B1 | * | 3/2001 | Ito | 219/270 |
| 6,359,261 B1 | * | 3/2002 | Watanabe et al. | 219/270 |

FOREIGN PATENT DOCUMENTS

| | | | |
|---|---|---|---|
| JP | 63-297925 | * | 12/1988 |
| JP | 2-157164 | * | 1/1990 |
| JP | 2737521 B2 | | 7/1993 |
| JP | 5-174948 | | 7/1993 |
| JP | 8-73286 | * | 3/1996 |
| JP | 8-273806 | | 10/1996 |
| JP | 10-338575 | * | 12/1998 |

* cited by examiner

Primary Examiner—John A. Jeffery
(74) Attorney, Agent, or Firm—Brinks Hofer Gilson & Lione

(57) ABSTRACT

A ceramic heater includes a silicon nitride ceramic substrate and a heating member embedded in the silicon nitride ceramic substrate. An Al-thickened layer is formed in a surface layer portion of the silicon nitride ceramic substrate. The Al-thickened layer has an Al concentration higher than that of an internal layer portion of the silicon nitride ceramic substrate. The Al-thickened layer assumes such a graded composition structure that the Al concentration increases toward the surface of the silicon nitride ceramic substrate.

10 Claims, 13 Drawing Sheets

1 μm

1 μm

CERAMIC HEATER AND METHOD FOR MANUFACTURING THE SAME

BACKGROUND OF THE INVENTION

1. Field of the Invention

The present invention relates to a ceramic heater for use in, for example, a glow plug, as well as to a method for manufacturing the ceramic heater.

2. Description of the Related Art

A conventional ceramic heater for use in, for example, a ceramic glow plug includes an insulating ceramic substrate and a resistance heating member embedded in the ceramic substrate and formed of, for example, a conductive ceramic material. Because of excellent thermal shock resistance and high temperature strength, silicon nitride ceramic is a popular material for the ceramic substrate.

As in the case of manufacture of many other ceramics, manufacture of silicon nitride ceramic employs a sintering aid. A sintering aid melts into a liquid phase during firing to thereby accelerate densification of a ceramic sintered body to be obtained, and plays a role in forming a grain boundary phase for bonding silicon nitride main phase (grains) of the ceramic sintered body. Sintering aids which are commonly used in manufacturing silicon nitride ceramic include magnesium oxide (MgO) and a combination of alumina ($Al_2O_3$) and yttria ($Y_2O_3$). However, these sintering aids involve a drawback in that a vitric grain boundary phase, whose softening point is low, tends to be formed in firing, and thus high temperature strength, particularly strength at 1200° C. or higher, of an obtained sintered body tends to be impaired. When a rare-earth metal oxide and silica are added as sintering aids, the grain boundary phase can be crystallized to thereby contribute to enhancement of high temperature strength of a sintered body. However, since a liquid phase generated during firing exhibits poor fluidity, the sintering speed lowers. As a result, nonuniform sintering tends to occur, and thus variations in room temperature strength tend to occur among sintered bodies.

In order to cope with the above problems, Japanese Patent No. 2735721 discloses a silicon nitride ceramic heater whose manufacture employs a rare-earth metal oxide and alumina as sintering aids. Conceivably, addition of $Al_2O_3$ appropriately improves the sintering speed and increases the strength of the grain boundary phase.

However, in the technique disclosed in the above publication, since $Al_2O_3$ is added uniformly to the entirety of the ceramic sintered body, the softening point of the grain boundary phase tends to lower. Thus, high temperature strength unavoidably lowers. Also, since an Al component is contained in the form of $Al_2O_3$, the grain boundary phase tends to be vitrified, causing an adverse effect on the intended improvement of high temperature strength.

SUMMARY OF THE INVENTION

The present invention provides a ceramic heater comprising a silicon nitride ceramic substrate (hereinafter referred to as either a ceramic substrate or a substrate) and a resistance heating member embedded in the silicon nitride ceramic substrate. An Al-thickened layer is formed in a surface layer portion of the silicon nitride ceramic substrate. The Al-thickened layer has an Al concentration higher than that of an internal layer portion of the silicon nitride ceramic substrate.

According to the above configuration, the Al-thickened layer is formed merely in a surface layer portion of the ceramic substrate. Thus, even when the Al component causes lowering of the softening point of the grain boundary phase, the influence is limited to the surface layer portion of the ceramic substrate. Therefore, the high temperature strength of the ceramic substrate is unlikely to be impaired. Formation of the Al-thickened layer suppresses growth of silicon nitride main phase (hereinafter, referred to as may be called merely main phase) grains in the surface layer portion of the ceramic substrate, so that abnormally grown grains which provide a starting point of fracture are hardly produced. Therefore, the Al-thickened layer prevents variations in strength, particularly room temperature strength, among ceramic substrates.

Preferably, the thickness of the Al-thickened layer is 50 $\mu$m to 1000 $\mu$m. When the thickness is less than 50 $\mu$m, variations in room temperature strength among silicon nitride ceramic substrates may fail to be effectively suppressed. When the thickness is in excess of 1000 $\mu$m, sufficient high temperature strength may fail to be imparted to the ceramic substrate. More preferably, the thickness is 50 $\mu$m to 500 $\mu$m. Preferably, the Al-thickened layer assumes an average Al concentration of 0.1% to 5% by weight. When the Al concentration is less than 1% by weight, growth of main phase grains in the surface layer portion of the ceramic substrate may fail to be effectively suppressed, potentially causing variations in room temperature strength among ceramic substrates. When the Al concentration is in excess of 5% by weight, the high temperature strength of the Al-thickened layer itself may be impaired, potentially failing to attain enhancement of strength of the ceramic substrate intended by means of the Al-thickened layer.

When growth of main phase grains in the Al-thickened layer is effectively suppressed, the average grain size of the silicon nitride main phase in the Al-thickened layer becomes smaller than that of the silicon nitride main phase in an internal layer portion of the ceramic substrate. Preferably, the average grain size of the silicon nitride main phase in the Al-thickened layer is 0.1 $\mu$m to 1 $\mu$m, and that of the silicon nitride main phase in the internal layer portion is 0.2 $\mu$m to 5 $\mu$m. In either case, when the average grain size is below the lower limit, preparation of material powder for attainment of the average grain size becomes very difficult. When the average grain size is in excess of the upper limit, the strength of the ceramic substrate may become insufficient In order to suppress formation of a starting point of fracture, the maximum grain size of the main phase in the Al-thickened layer is preferably not greater than 10 $\mu$m. Herein, the grain size is defined as follows. Various pairs of parallel lines are drawn tangent to the contour of a crystal grain observed on a sectional microstructure of the ceramic substrate, in such a manner as not to traverse the crystal grain. The distance between the parallel lines of each pair is measured. The maximum distance is defined as the grain size of the crystal grain.

The silicon nitride ceramic substrate assumes, for example, a microstructure such that $Si_3N_4$ grains are bonded by means of a grain boundary phase (bonding phase) derived from a sintering aid component, which will be described later. Preferably, the main phase is predominantly composed of an $Si_3N_4$ phase which contains $\beta$-$Si_3N_4$ in an amount of not less than 70% by volume (preferably, not less than 90% by volume). In this case, the $Si_3N_4$ phase may be such that a portion of Si or N atoms may be replaced with Al or oxygen atoms and such that metallic atoms of, for example, Li, Ca, Mg, or Y, are incorporated into the phase in the form of solid solution. Examples of such a phase construction are sialon expressed by the following formulas.

β-sialon: $Si_6-Si_6Al_zO_zN_{8-z}$ (z=0 to 4.2) α-sialon: $M_x(Si,Al)_{12}(O,N)_{16}$ (x=0 to 2)

where M represents Li, Mg, Ca, Y, or R (a rare-earth element other than La and Ce). Herein, unless otherwise specified, the term "predominant" or "predominantly" used in relation to content means that the content of a substance in question is contained in an amount of not less than 50% by weight.

Preferably, a predominate portion of the Al component in the ceramic substrate is present in the form of an inorganic compound other than $Al_2O_3$. Specifically, it is preferable that the Al component be integrated into the main phase through replacing a silicon component as mentioned above and that the Al component present in the grain boundary phase assume the form of nitride or oxynitride or the form of composite nitride, composite oxide, or composite oxynitride with another sintering aid component. The Al component present in such a form suppresses vitrification of the grain boundary phase or further enhances suppression of growth of crystal grains in the main phase, thereby effectively suppressing impairment in the high temperature strength of the ceramic substrate. This effect is developed irrespective of whether or not the surface layer portion of the ceramic substrate is thickened with the Al component.

The present invention further provides a ceramic heater comprising a silicon nitride ceramic substrate containing an Al component and a resistance heating member embedded in the silicon nitride ceramic substrate. The Al component is present in the silicon nitride ceramic substrate predominantly in the form of an inorganic compound other than $Al_2O_3$.

Next, a sintering aid component is predominantly engaged in formation of the bonding phase; however, a portion of the sintering aid component may be integrated into the main phase. The bonding phase may contain unavoidable impurities; for example, silicon oxide contained in silicon nitride material powder, in addition to an intentionally added component serving as a sintering aid.

A sintering aid component usable in the present invention is not limited to a rare-earth component. For example, elements of Groups 4A, 5A, 3B, and 4B of the Periodic Table, such as Si and Al, can be used to such an extent as not to impair the effect of the present invention. The silicon nitride ceramic substrate to be obtained may contain a sintering aid component in an amount of 3% to 15% by weight on an element basis. When the content of the sintering aid component is less than 3% by weight, a dense sintered body is hardly obtained. When the content of the sintering aid component is in excess of 15% by weight, strength, toughness, or heat resistance may become insufficient. The content of the sintering aid component is preferably 6% to 10% by weight.

Rare-earth components usable in the present invention are Sc, Y, La, Ce, Pr, Nd, Sm, Eu, Gd, Tb, Dy, Ho, Er, Tm, Yb, and Lu. In particular, Tb, Dy, Ho, Er, Tm, and Yb can be favorably used, since the elements, when added, accelerate crystallization of the grain boundary phase and improve high temperature strength. Combined addition of a rare-earth component and the Al component synergistically suppresses abnormal growth of crystal grains in the main phase and variations in room temperature strength among ceramic substrates (in particular, the synergistic suppression becomes more effective when one or more rare-earth elements among Tb, Dy, Ho, Er, Tm, and Yb are used). Conceivably, this is because presence of the above rare-earth element(s) facilitates presence of the Al component in the form of an inorganic compound other than $Al_2O_3$. The synergistic effect is maximally yielded when the Al content of the ceramic substrate is 0.1% to 5% by weight, and the rare-earth component content of the ceramic substrate is 3% to 15% by weight.

In order to accelerate crystallization of the grain boundary phase, it is preferable that a rare-earth component serving as a sintering aid component be present in the form of a composite oxide with Si; specifically, the rare-earth component be contained in the form of $R_2SiO_5$ and/or $R_2Si_2O_7$, where R is the rare-earth element. Whether or not the composite oxides are contained in a crystalline form can be confirmed by various known processes of crystal analysis; for example, X-ray diffractometry for measuring diffraction patterns, or selected area diffractometry using a transmission electron microscope.

In order to accelerate crystallization of the grain boundary phase, an excess silicon oxide component which is not involved in formation of the main phase must be contained in a necessary and sufficient amount. The excess silicon oxide component accelerates, for example, formation of crystals of the aforementioned composite oxide. The content of the excess silicon oxide component can be estimated from the amount of excess oxygen, which will be described below. The amount of sintering aid components, excluding Si and Al, contained in the ceramic substrate and the total oxygen content of the ceramic substrate are obtained. The amount of oxygen required for all the sintering aid components to be present in the form of oxide is subtracted from the total oxygen content. The thus-obtained amount of oxygen is defined as the amount of excess oxygen. In order to reliably yield the aforementioned effect through addition of a rare-earth component as a sintering aid component, the amount of excess oxygen is preferably 1% to 10% by weight on an $SiO_2$ basis. When the amount of excess oxygen is less than 1% by weight on the $SiO_2$ basis, sinterability is impaired. When the amount of excess oxygen is in excess of 10% by weight, the softening point of the grain boundary phase drops, potentially resulting in impairment in high temperature strength.

Preferably, the Al-thickened layer assumes such a graded composition structure that the Al concentration increases toward the surface of the ceramic substrate. Through employment of the structure, a compositionally discontinuous boundary portion is unlikely to be formed between the Al-thickened layer and the internal layer portion of the ceramic substrate, thereby further enhancing the strength of the ceramic substrate.

When a gradient is present in the Al concentration of the Al-thickened layer, the thickness t of the Al-thickened layer is defined as shown in FIG. 11. Specifically, an Al concentration curve is obtained through measurement in the direction of depth x from the surface of the silicon nitride ceramic substrate. The Al concentration curve is expressed by $$C = F(x) \ldots \quad (1)$$

On the curve (1), CO is an Al concentration by weight measured on the surface of the substrate, and CB is an average Al concentration by weight of an internal portion of the substrate (CB may be substantially zero in some cases). A straight line is defined as follows.

$$C = CB + 0.5 (CO - CB) \ldots \quad (2)$$

On the x-C plane, the intersection B of the curve (1) and the straight line (2) is obtained (when a plurality of intersections are formed due to influence of noise appearing on the curve (1), the one closest to the substrate surface is selected). The x coordinate of the intersection B is defined as the thickness t of the Al-thickened layer. The Al concentration curve can be obtained by a so-called line analysis. In this line analysis, an analysis line AL is first defined on the cross section of the substrate in the above-mentioned x direction, and the concentration of Al is determined along the analysis line AL by making use of an electron probe X-ray microanalyzer (EPMA). The Al concentration curve is obtained as a profile of variation in characteristic X-ray intensity of the Al component along the analysis line AL. Herein, the characteristic X-ray intensity of the Al component is considered proportional to the Al concentration.

When a gradient is present in the Al concentration in the Al-thickened layer, the ratio CB/CO (hereinafter, may be called gradient) is preferably not greater than 0.9.

The above-mentioned ceramic heater having the Al-thickened layer can be manufactured by the following method of the present invention. The method comprises the step of firing a green body or a calcined body of the silicon nitride ceramic substrate while an Al component source substance is in contact with the surface of the green body or calcined body, to thereby form in a surface layer portion of the obtained silicon nitride ceramic substrate an Al-thickened layer having an Al concentration higher than that of an internal layer portion of the silicon nitride ceramic substrate. The method has the following advantages. The Al component is diffused from the surface of the substrate to thereby easily form the Al-thickened layer. Firing and formation of the Al-thickened layer can be carried out in a single process, thereby enhancing work efficiency. The Al concentration of the Al-thickened layer can be easily adjusted. Through unidirectional diffusion of the Al component, a gradient can be easily introduced in the Al concentration of the Al-thickened layer.

The above-mentioned firing process may comprise the steps of: forming a coating layer containing the Al component source substance on the surface of a cavity of a pressing die; and hot pressing the green body or the calcined body by use of the pressing die. A parting component may be contained in the coating layer containing the Al component source substance. In this case, in a process for applying a parting material to the surface of the pressing die, the Al component source substance can be simultaneously applied to the die surface, thereby shortening the manufacturing process.

In order to contain the Al component in the ceramic substrate in the form of an inorganic compound other than $Al_2O_3$ as mentioned previously, firing can be performed at a temperature not lower than 1700° C. in a nitrogen atmosphere having a partial pressure of oxygen (contained, for example, as an impurity) of 0.01 Pa to 100 Pa and a partial pressure of nitrogen not lower than approximately $5 \times 10^4$ Pa (approx. 0.5 atmosphere).

Thus, it is an object of the present invention is to provide a ceramic heater whose silicon nitride ceramic substrate substantially maintains high temperature strength without impairment resulting from addition of an Al component, and featuring low variations in room temperature strength among silicon nitride ceramic substrates.

Another object of the present invention is to provide a method for manufacturing the above-described ceramic heater.

Various other objects, features and many of the attendant advantages of the present invention will be readily appreciated as the same becomes better understood by reference to the following detailed description of the preferred embodiments when considered in connection with the accompanying drawings

DETAILED DESCRIPTION OF THE INVENTION

Embodiments of the present invention will next be described in detail with reference to the drawings.

Figure 1:
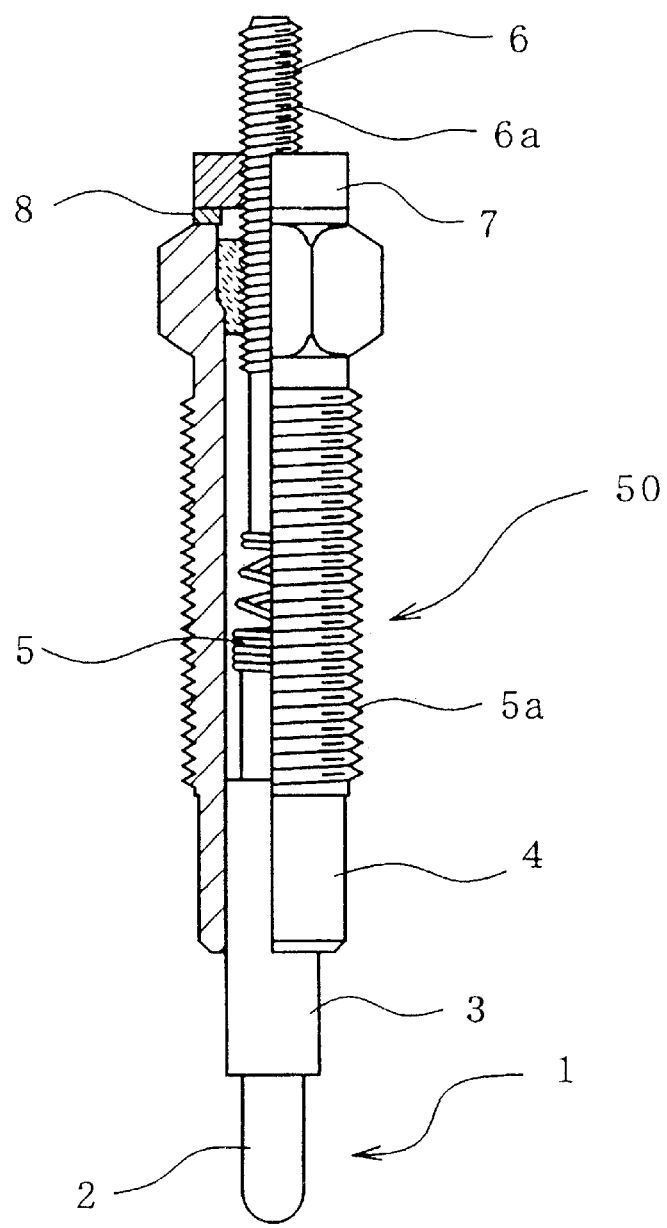
FIG. 1 is a partial, sectional front view showing a glow plug employing a ceramic heater of the present invention.

FIG. 1 shows a glow plug denominated by the refence number 50 using a ceramic heater manufactured by a method of the present invention while an internal structure thereof is partially exposed. The glow plug 50 includes a ceramic heater 1 disposed at one end thereof; a metal sleeve 3 which covers the ceramic heater 1 such that an end portion 2 of the ceramic heater 1 projects from the metal sleeve 3; and a cylindrical metal housing 4 which covers the sleeve 3. The ceramic heater 1 and the sleeve 3 are brazed together, whereas the sleeve 3 and the metal housing 4 are brazed together.

One end portion of a connection member 5 is fitted to a rear end portion of the ceramic heater 1. The connection member 5 is formed of a metal wire such that opposite end portions thereof are each formed into the shape of a helical spring. The other end portion of the connection member 5 is fitted to a corresponding end portion of a metal shaft 6 inserted into the metal housing 4. A rear portion of the metal shaft 6 extends to the exterior of the metal housing 4. A nut 7 is engaged with a thread portion 6a, which is formed on the peripheral surface of the extended portion of the metal shaft 6, and is tightened toward the metal housing 4 to thereby fixedly attach the metal shaft 6 to the metal housing 4. An insulation bushing 8 is interposed between the nut 7 and the metal housing 4 An external thread portion 5a is formed on the external surface of the metal housing 4 and is adapted to fixedly attach the glow plug 50 to an unillustrated engine block.

Figure 2:
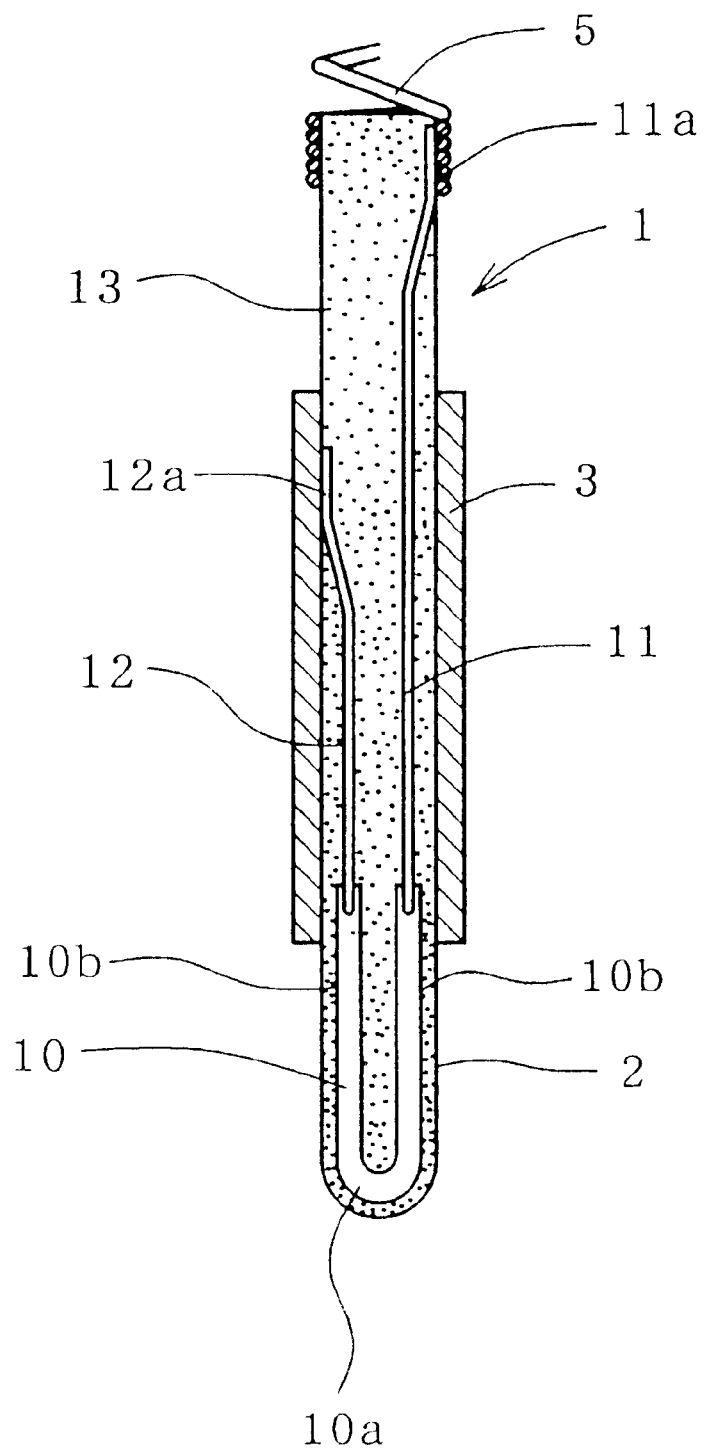
FIG. 2 is a full, sectional view showing the ceramic heater.

As shown in FIG. 2, the ceramic heater 1 includes a U-shaped ceramic resistance heating member (hereinafter, called merely a heating member) 10. End portions of wire-like or rod-like electrodes 11 and 12 are embedded in corresponding end portions of the heating member 10. The heating member 10 and the electrodes 11 and 12 are entirely embedded in a rod-like silicon nitride ceramic substrate 13 having a circular cross section. The heating member 10 is disposed such that a direction-changing portion 10a is located at a tip end portion of the ceramic substrate 13.

Material for the ceramic substrate 13 is prepared, for example, by adding sintering aid powder, such as $Er_2O_3$ powder or $Yb_2O_3$ powder, to $Si_3N_4$ powder in an amount of 3% to 15% by weight. The resulting mixture is formed into a green body, which is then sintered to obtain the ceramic substrate 13. As shown in FIG. 10D, an Al-thickened layer 2s is formed in a surface layer portion of the ceramic substrate 13. The Al-thickened layer 2s has an Al concentration higher than that of an internal layer portion of the ceramic substrate 13 In the Al-thickened layer 2s, the Al concentration changes with a gradient; i.e., gradually increases toward the surface of the ceramic substrate 13.

Material for the heating member 10 is prepared, for example, by the steps of mixing $Si_3N_4$ powder and WC or $MoSi_2$ powder, which is conductive ceramic powder; and adding to the mixture sintering aid powder similar to that used for the ceramic substrate 13, in an amount of 0.8% by weight to 10.5% by weight. The resulting mixture is formed into a green body, which is then sintered to obtain the heating member 10. The sintered body has a microstructure that WC or $MoSi_2$ grains are dispersed in an $Si_3N_4$ main phase. The electrodes 11 and 12 are made of a metal wire of, for example, W, W-Re, Mo, Pt, Nb, Ta, or Nichrome.

In FIG. 2, a thin metal layer of, for example, nickel (not shown) is formed, by a predetermined method (for example, plating or vapor deposition process), on the surface of the ceramic substrate 13 in a region including an exposed portion 12a of the electrode 12. The sleeve 3 is brazed to the thin metal layer to thereby be fixedly attached to the ceramic substrate 13 and electrically connected to the electrode 12.

Similarly, a thin metal layer is formed on the surface of the ceramic substrate 13 in a region including an exposed portion 11a of the electrode 11. The connection member 5 is brazed to the thin metal layer. Thus, power is supplied from an unillustrated power supply to the heating member 10 via the metal shaft 6 (FIG. 1), the connection member 5, and the electrode 11. The heating member 10 is grounded via the electrode 12, the sleeve 3, the metal housing 4 (FIG. 1), and an unillustrated engine block.

A method for manufacturing the ceramic heater 1 will next be described. First, as shown FIG. 3A, electrode materials 30 are disposed in a mold 31 having a U-shaped cavity 32, which corresponds to the heating member 10, such that respective end portions are inserted into the cavity 32. A compound 33 is injected into the cavity 32. The compound 33 contains a binder (an organic binding agent) and a material ceramic powder composed of sintering aid powder and a predominant amount of WC or $MoSi_2$ powder and $Si_3N_4$ powder. The electrode materials 30 and a U-shaped heating member green body 34 are integrated into a unitary green body 35 shown in FIG. 3B. The heating member green body 34 is formed such that the cross section thereof assumes a substantially circular shape.

Figure 4A:
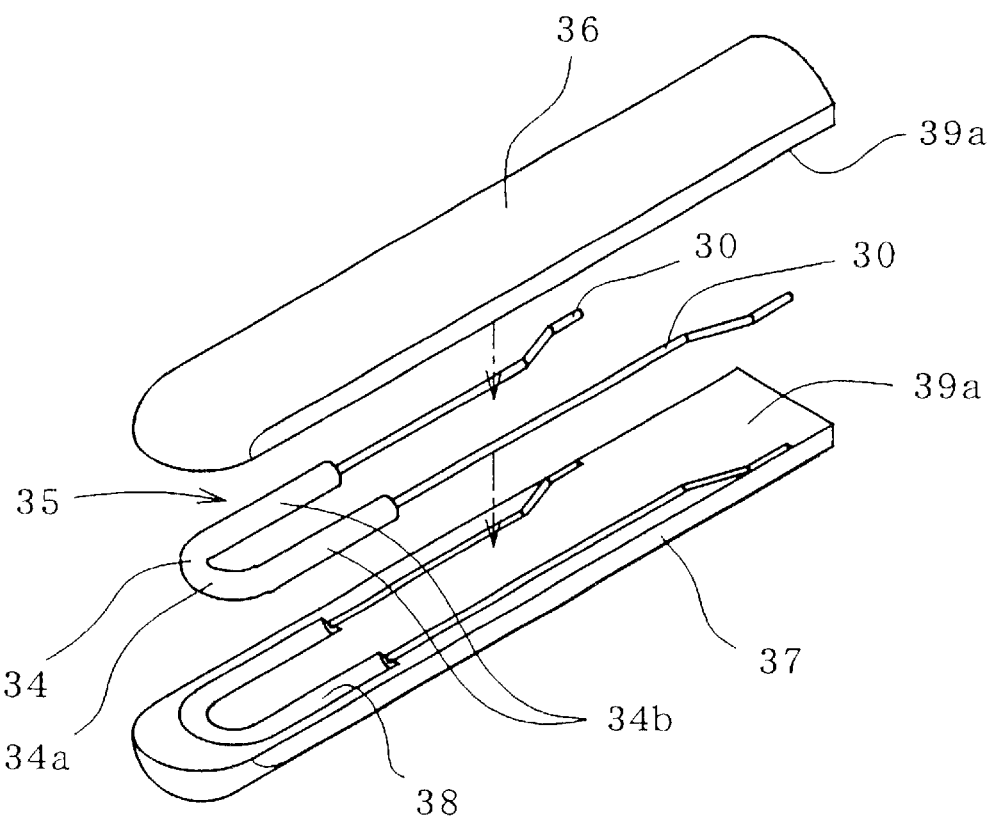
FIG. 4A is an exploded perspective view of a composite green body of the ceramic heater during a subsequent step of the manufacturing process.
Figure 5A:
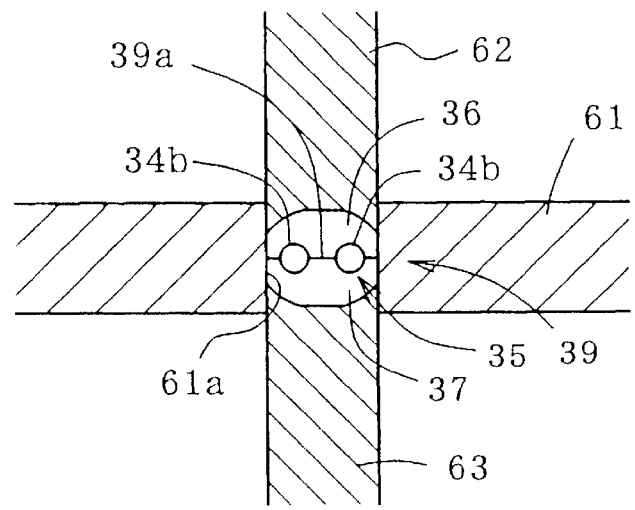
FIG. 5A is a schematic, sectional view showing formation of the composite green body through pressing.
Figure 5B:
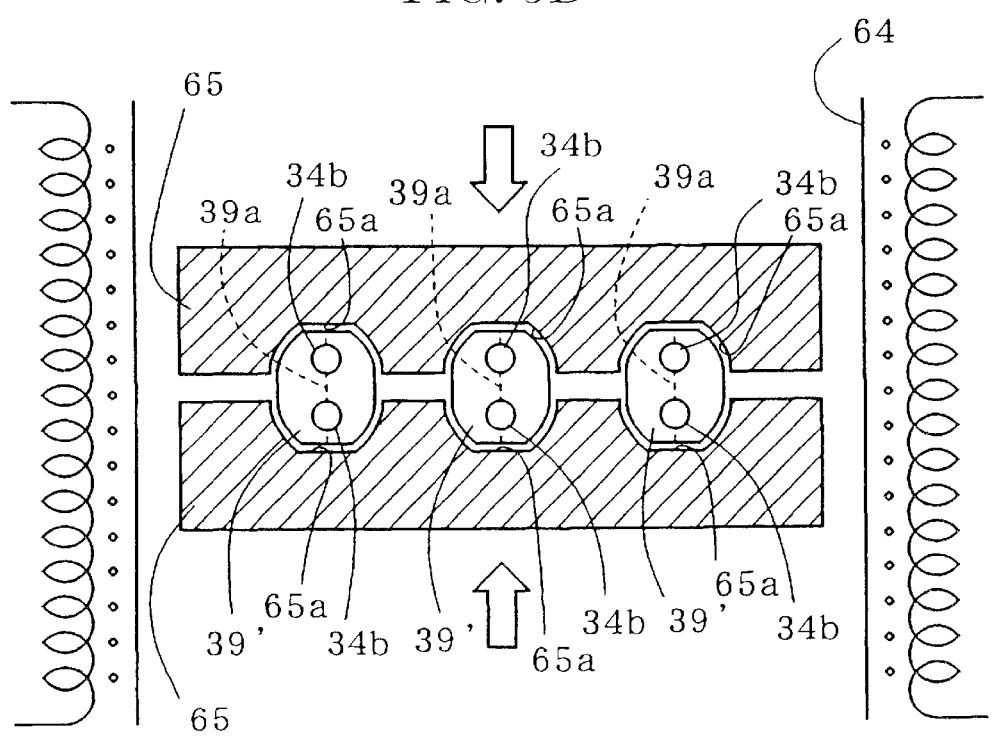
FIG. 5B is a schematic, sectional view showing hot-pressing of the composite green body.

Material powder for the ceramic substrate 13 is die pressed into half green bodies 36 and 37 shown in FIG. 4A. A depression 38 having a shape corresponding to the unitary green body 35 is formed on a mating surface 39a of each of the half green bodies 36 and 37. Next, the half green bodies 36 and 37 are joined together at the mating surfaces 39a, while the unitary green body 35 is accommodated in the depressions 38. Then, as shown in FIG. 5A, an assembly of the half green bodies 36 and 37 and the unitary green body 35 is placed in a cavity 61a of a die 61 and is then pressed by means of punches 62 and 63, thereby obtaining a composite green body 39 as shown in FIGS. 5B and 6A. The pressing direction is substantially perpendicular to the mating surfaces 39a of the half green bodies 36 and 37.

Figure 6:
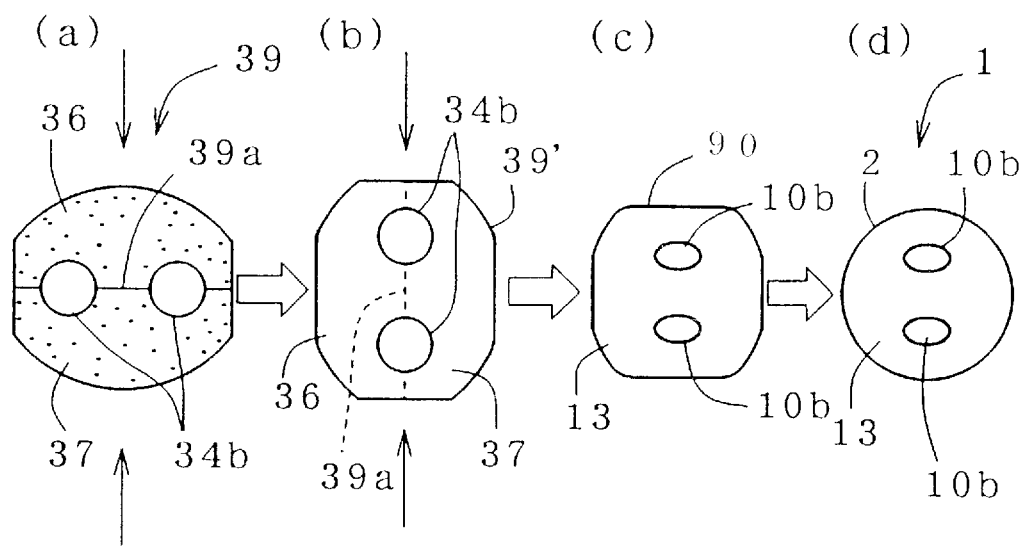
FIG. 6 is a schematic view showing a change in the shape of a cross section while the composite green body changes to a sintered body in the course of firing.

In order to remove a binder component and the like contained in the material powder, the thus-obtained composite green body 39 is calcined at a predetermined temperature (for example, approximately 600° C.) to thereby become a calcined body 39' (a calcined body can be considered a composite green body in the broad sense) shown in view (b) of FIG. 6. Subsequently, as shown in FIG. 5B, the calcined body 39' is placed in cavities 65a of hot-pressing dies 65 made of graphite or the like.

Figure 8A:
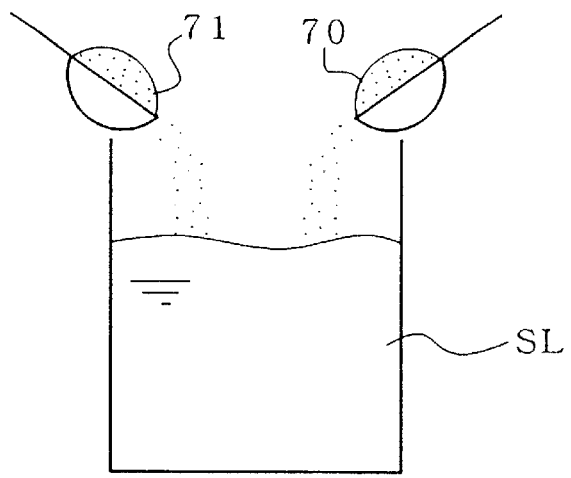
FIGS. 8A, 8B and 8C are process step diagrams which show the method of manufacturing the ceramic heater according to the present invention and a modification thereof.
Figure 8B:
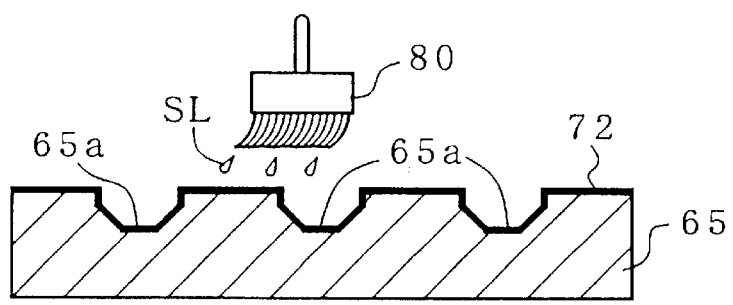
Figure 8C:
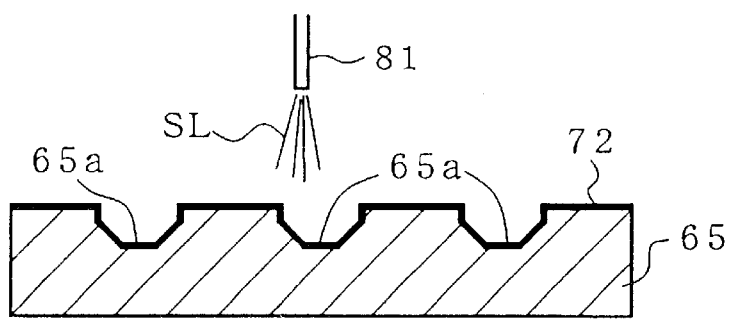

A parting material containing the Al component source substance is applied to the surface of the cavity 65a. For example, as shown in FIG. 8A, parting material powder 70 (for example, fine powder of boron nitride (BN)) and Al source powder 71 (for example, alumina powder), together with a dispersant, are placed in a solvent (for example, ethanol) to thereby prepare a coating suspension SL. The coating suspension SL is manually applied to the cavity surface by means of a brush 80 as shown in FIG. 8B or sprayed on the cavity surface by means of a spray nozzle 81 as shown in FIG. 8C. Subsequently, the solvent is allowed to evaporate for drying, thereby forming a composite coating layer 72 which contains the parting material powder 70 and the Al source powder 71.

For uniform coating and in order to reliably obtain a required coating layer thickness, the coating suspension SL contains solid matter, which is composed predominantly of the parting material powder 70 and the Al source powder 71, in an amount of preferably 3% to 20% by volume. In order to provide favorable parting performance and reliably obtain an appropriate thickness of an Al-thickened layer to be formed, the composite coating layer 72 has a thickness of preferably 25 μm to 100 μm. Similarly, the percentage of the content of the Al source powder 71 to the total content of the parting material powder 70 and the Al source powder 71 is preferably 10% to 80% by weight. In order to uniformly diffuse the Al component during sintering, the Al source powder 71 has an average grain size of preferably 0.5 μm to 10 μm.

Figure 4B:
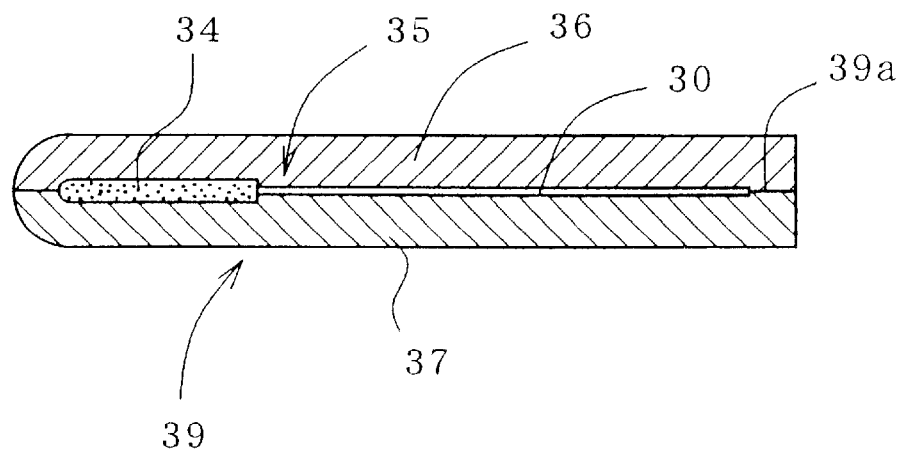
FIG. 4B is a sectional view of the composite green body during the manufacturing process.

As shown in FIG. 5B, the calcined body 39' is placed in a firing furnace (hereinafter referred to as "furnace") 64 while being held between the pressing dies 65, which are coated with the composite coating layer 72 as mentioned above. In the furnace 64, the calcined body 39' is sintered at a predetermined temperature not lower than 1700° C. (for example, approximately 1800° C.) while being pressed between the pressing dies 65, to thereby become a sintered body 90 as shown in view (c) of FIG. 6. The heating-member green body 34 shown in FIG. 4B is sintered into the heating member 10, and half green bodies 36 and 37 are sintered into the ceramic substrate 13. The electrode materials 30 become the electrodes 11 and 12.

Figure 10A:
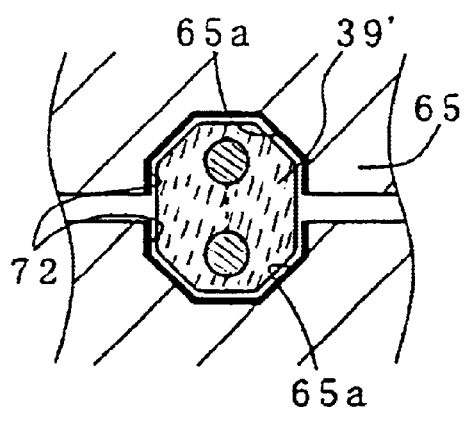
FIGS. 10A, 10B, 10C and 10D are views explaining steps in the method of manufacturing the ceramic heater according to the present invention.
Figure 10B:
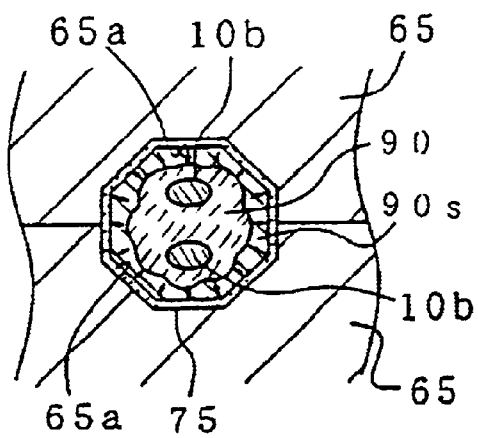

As shown in FIG. 10B, the Al component diffuses into the sintered body 90 from the Al source powder 71 contained in the composite coating layer 72 shown in FIG. 10A, to thereby form an Al-thickened layer 90s in which the Al concentration increases toward the surface of the sintered body 90. Firing is performed, for example, in the following manner. Nitrogen of the atmospheric pressure which includes impurity oxygen having a partial pressure of 0.01 Pa to 100 Pa is introduced into the furnace 64. The furnace temperature is raised to a predetermined firing temperature (for example, 1800° C.) and maintained at the temperature for firing.

Figure 12:
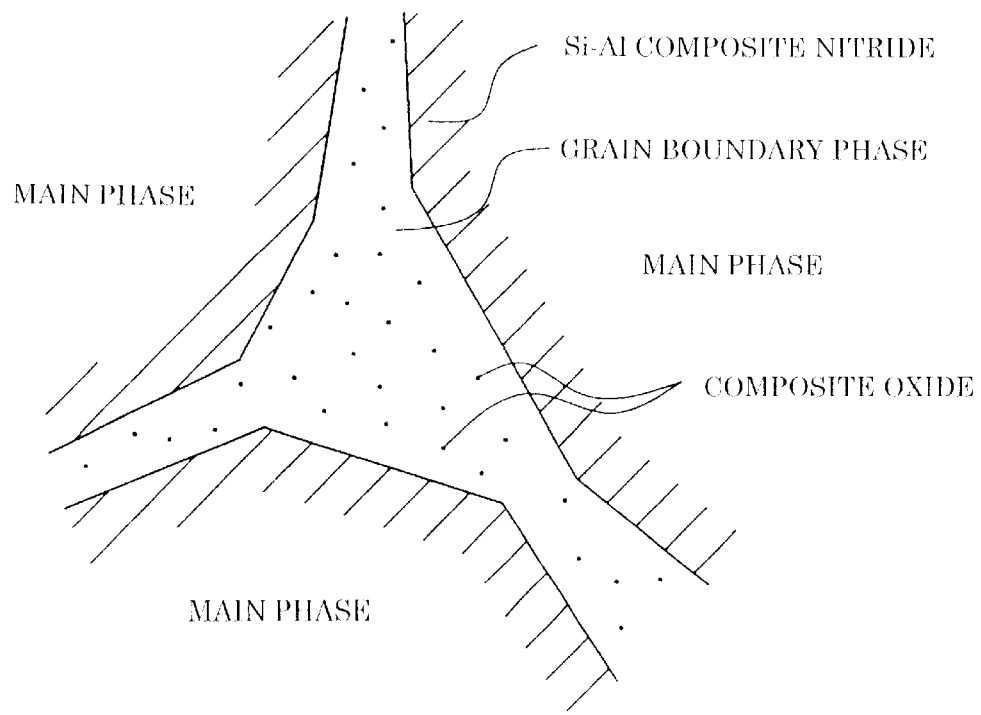
FIG. 12 is a schematic view showing an example of the structure of the silicon nitride ceramic substrate of the ceramic heater of the present invention.

FIG. 12 schematically shows an example of ceramic structure in the Al-thickened layer 90s. The Al component diffusing from the composite coating layer 72 replaces, for example, the silicon component in the silicon nitride main phase to thereby form an Si-Al composite nitride (or oxynitride). Also, in the grain boundary phase, the diffusing Al component forms predominantly an inorganic compound other than alumina, such as a composite nitride, composite oxide, or composite oxynitride with another sintering aid component. When a sintering aid contains a rare-earth component R, a crystalline composite oxide with silicon, such as $R_2SiO_5$ and/or $R_2Si_2O_7$, is formed. In any case, the Al component is present not in the form of alumina, which tends to accelerate vitrification of the grain boundary phase, but in the form of a composite nitride or a composite oxynitride which cover the surface of the main phase, or in the form of a crystalline composite inorganic compound which is dispersed in the grain boundary phase. Thus, growth of crystal grains in the main phase is suppressed; therefore, the resulting microstructure is unlikely to involve local grain growth, which tends to cause variations in strength among ceramic substrates.

Figure 10C:
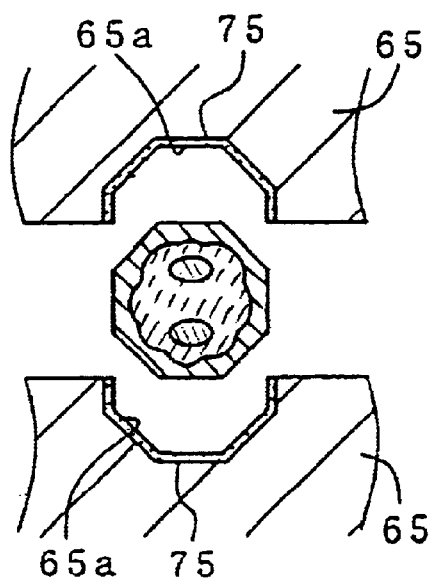
Figure 10D:
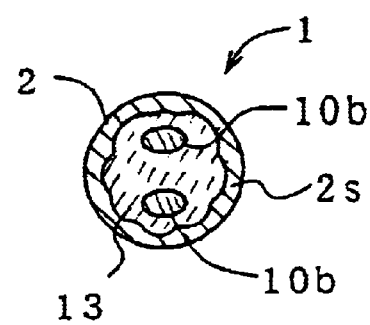

In firing mentioned above, the calcined body 39' is fired while being compressed in the direction parallel with the mating surfaces 39a of the half green bodies 36 and 37 as shown in view (c) of FIG. 6, to thereby be formed into the sintered body 90. As shown in view (c) of FIG. 6, a straight portion 34b of the heating member green body 34 is deformed such that the circular cross section thereof is squeezed in the above mentioned direction of compression, to thereby become a straight portion 10b of the heating member 10 having an elliptic cross section. As shown in FIG. 10B, as a result of diffusion of the Al component into the sintered body 90, the composite coating layer 72 formed on the surface of the cavity 65a of the pressing die 65 becomes a parting layer 75 composed of residual parting material. As shown in FIG. 10C, by virtue of the parting layer 75, the sintered body 90 can be readily parted from the cavity 65a.

The external surface of the thus-obtained sintered body 90 is, for example, polished such that the cross section of the ceramic substrate 13 assumes a circular shape, thereby yielding the ceramic heater 1. In order to reliably obtain the Al-thickened layer 2s having a necessary and sufficient thickness even after polishing, the thickness of the Al-thickened layer 90s must be adjusted so as to include a polishing allowance.

Figure 9:
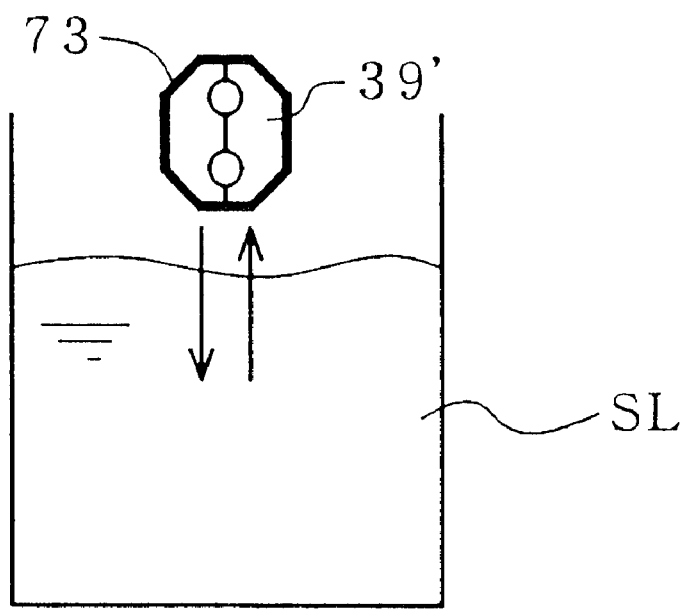
FIG. 9 is a process-explaining diagram showing a method of forming on a calcined body a coating layer containing Al source powder.

Notably, Al source powder may be applied to the surface of a calcined body. For example, as shown in FIG. 9, the calcined body 39' is dipped into the suspension SL in which the Al source powder is suspended, to thereby coat the calcined body 39' with the Al source powder. Subsequently, the calcined body 39' is dried to thereby form a coating layer 73 of the Al source powder on the calcined body 39'. The coating layer 73 may or may not contain parting material powder. When the coating layer 73 does not contain the parting material powder, a pressing die is preferably coated with a parting material. Notably, the suspension SL may be applied by a method other than dipping; for example, by spraying.

Figure 7:
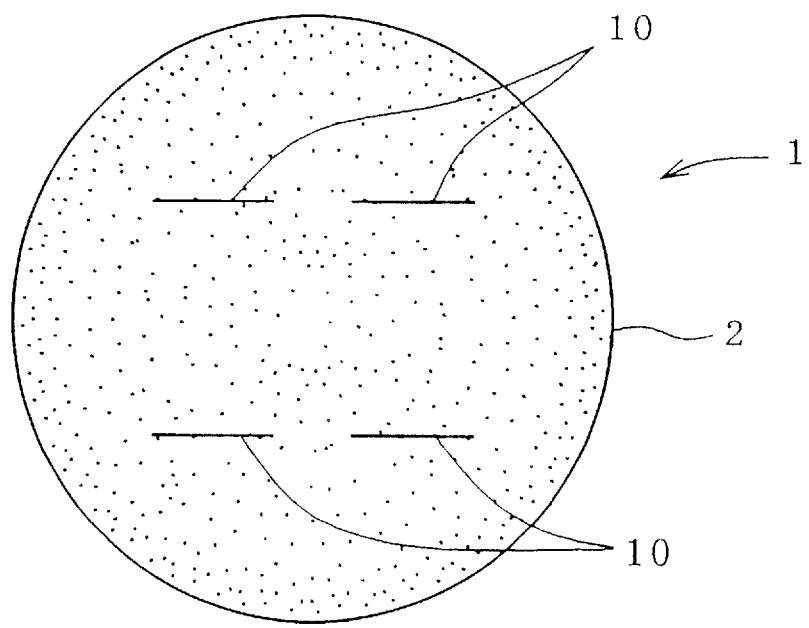
FIG. 7 is a sectional view showing another embodiment of the ceramic heater of the present invention.

The resistance heating member 10 may be formed in a different manner. As shown in FIG. 7, a paste of conductive ceramic powder is pattern printed on a green body of a ceramic substrate in the form of a heating member. Subsequently, the green body is fired to thereby form the resistance heating member 10 therein. Alternatively, the resistance heating member 10 may be formed of a metal of high melting point, such as W or W-Re.

EXAMPLES

Figure 3A:
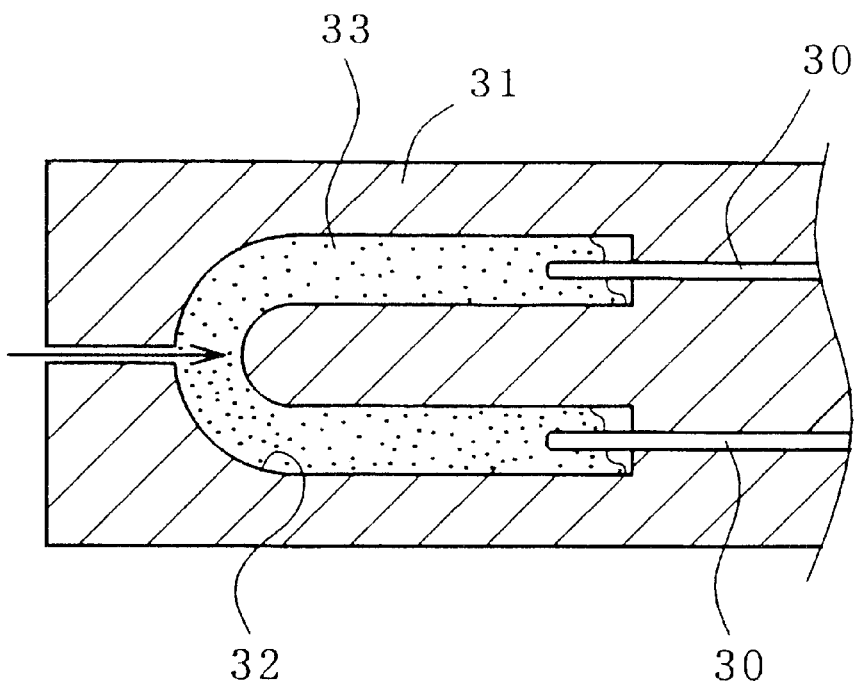
FIG. 3A is a sectional view showing an injection molding step performed for manufacturing a heating member.
Figure 3B:
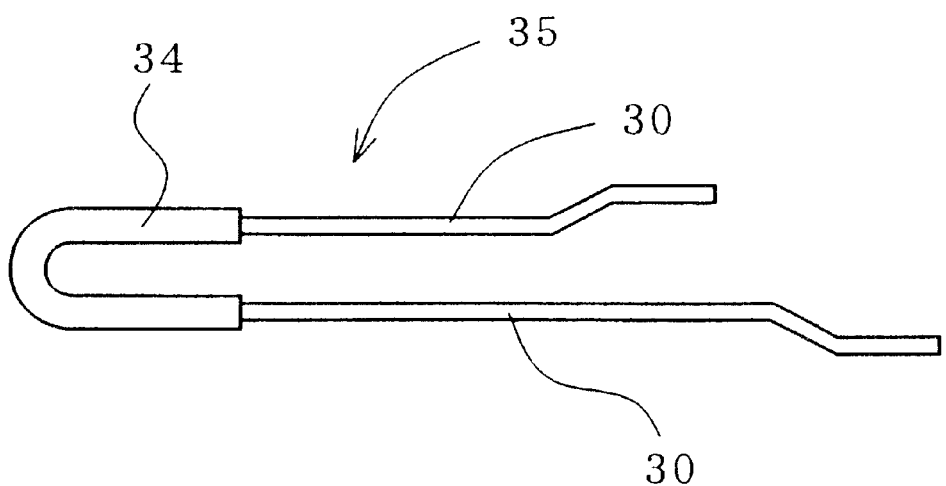
FIG. 3B is a schematic view of a unitary green body of the heating member during the manufacturing process.

Material powder for a ceramic substrate was prepared in the following manner. Various sintering aid powders were added to $Si_3N_4$ powder having an average grain size of 0.7 μm according to the composition shown in Table 1. The resulting mixture was wet-pulverized in a ball mill. A predetermined amount of binder was added to the resulting slurry. The resulting slurry was dried by a spray dry process, thereby yielding the material powder for a ceramic substrate. Material powder for a heating member was prepared in the following manner. 55% by mass WC powder having an average grain size of 1 μm, 40% by mass silicon nitride ($Si_3N_4$) powder, and 5% by mass $Er_2O_3$ powder serving as a sintering aid were mixed (the WC powder, the silicon nitride powder, and the $Er_2O_3$ powder were mixed so as to make a total amount of 100% by mass). The resulting mixture and a solvent were wet-mixed for 50 hours in a ball mill, followed by drying. To the resulting substance, polypropylene and wax serving as organic binders were added to thereby obtain a compound, followed by pelletization. Through use of the resulting pellets, injection molding was performed as shown in FIG. 3A, thereby yielding the unitary green body 35.

Through use of the above-mentioned material powder for a ceramic substrate, the half green bodies 36 and 37 shown in FIG. 4A were formed by the previously described method. The half green bodies 36 and 37 and the unitary green body 35 were integrally pressed into the composite green body 39 shown in FIG. 5A and view (a) of FIG. 6. The composite green body 39 was calcined at approximately 600° C. to thereby obtain the calcined body 39' shown in view (b) of FIG. 6, followed by firing through hot pressing. Sample No. 9, which falls within the scope of the present invention, was formed in the following manner. Alumina powder having an average grain size of 2 μm (50 parts by mass) was mixed with BN powder having an average grain size of 1 μm (50 parts by mass). The resulting mixture was suspended in ethanol to thereby obtain a coating suspension. The coating suspension was applied to the cavity surface of a hot pressing die, followed by drying to thereby form a composite coating layer having a thickness of approximately 50 μm on the cavity surface. Firing conditions were as follows: firing temperature 1800° C.; pressure 300 kgf/cm$^2$; and firing time 30 minutes. Nitrogen of the atmospheric pressure which includes impurity oxygen having a partial pressure of 0.01 Pa to 100 Pa was introduced into a furnace and heated to a temperature of 1800° C., thereby establishing a firing atmosphere. The calcined body 39' was fired under the firing conditions in the firing atmosphere.

Figure 11:
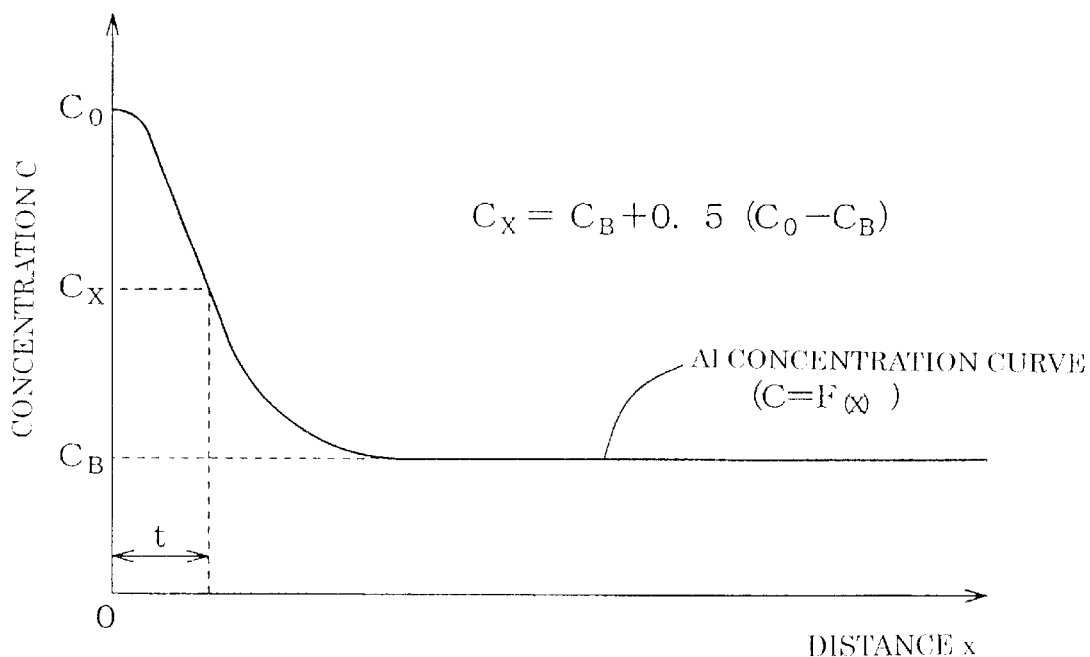
FIG. 11 is a graph showing definition of the thickness of an Al-thickened layer.
Figure 13A:
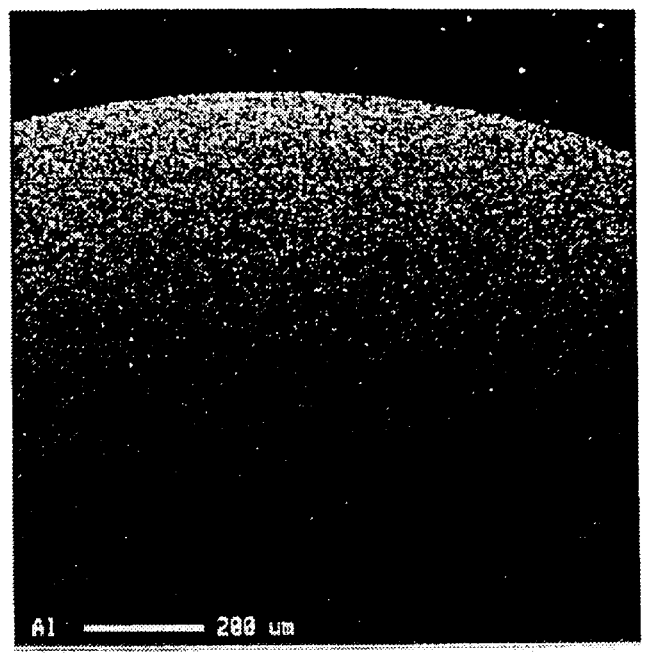
FIG. 13A is a partial photograph of the cross section of a sample which was manufactured in a test example and falls within the scope of the present invention, showing a secondary mapping image obtained by EPMA with respect to Al.
Figure 13B:
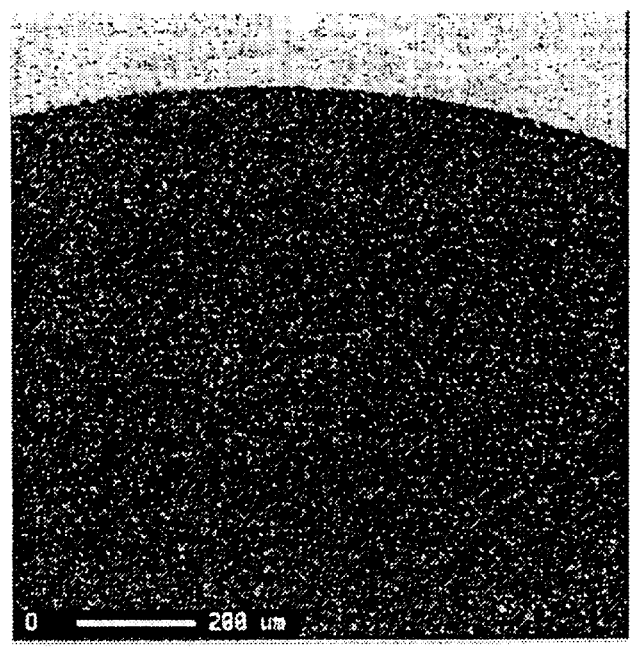
FIG. 13B is a partial photograph of the cross section of the sample, showing a secondary mapping image obtained by EPMA with respect to FIG. 14A is a sketch of the cross section of the sample obtained through observation by means of SEM, showing the microstructure of an internal layer portion of the sample.

Sample No. 9 was cut perpendicularly to the axis thereof. The cut surface was polished and subjected to EPMA for distribution of elements FIGS. 13A and 13B show the results. FIG. 13A shows intensity mapping of characteristic X-ray of Al (aluminum), and FIG. 13B shows that of O (oxygen). In FIGS. 13A and 13B, an arcuate contour of the cross section of Sample No. 9 appears at an upper portion of the image. In the image of the cross section, a whitish region is a region of high characteristic X-ray intensity; i.e., a region of high component concentration. As seen from FIG. 13A, a region in which the Al concentration is increased apparently; i.e., an Al-thickened layer is formed in a surface layer portion of Sample No. 9 (silicon nitride ceramic substrate) Furthermore, in Sample No. 9, the Al concentration decreases toward the internal layer portion. Line analysis which was conducted separately by means of EPMA revealed that the average thickness of the Al-thickened layer defined in FIG. 11 was approximately 280 μm.

Figure 14A:
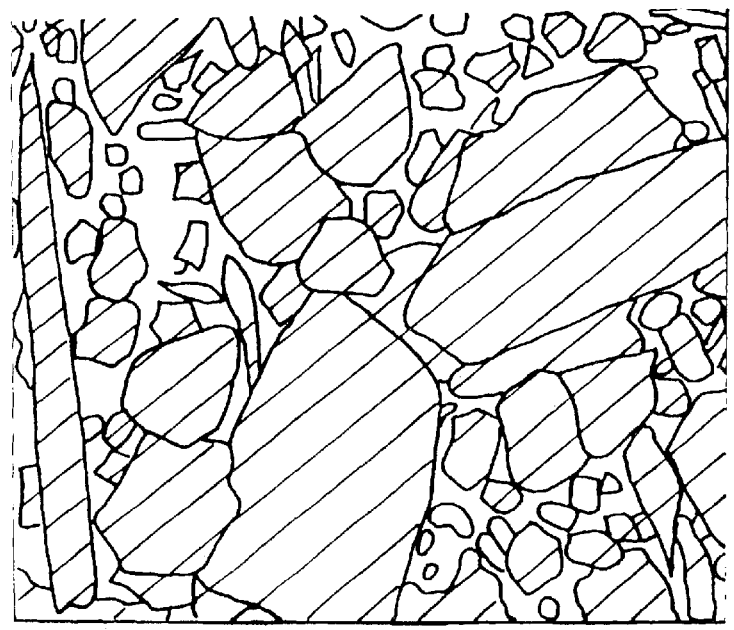
FIG. 14B is a sketch of the cross section of the sample obtained through observation by means of SEM, showing the microstructure of an surface layer portion of the sample.
Figure 14:
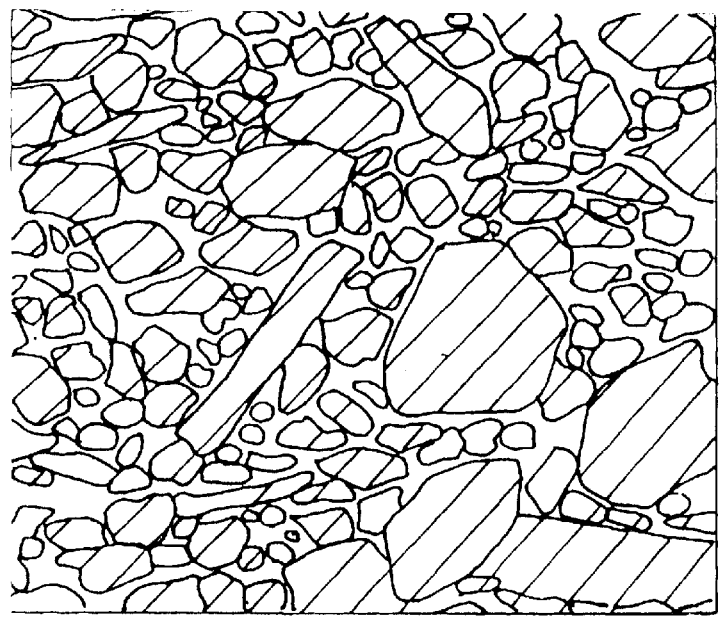

FIG. 14A shows the microstructure of an internal layer portion of Sample No. 9 as observed through a scanning electron microscope (SEM), whereas FIG. 14B shows that of the Al-thickened layer. As seen from FIGS. 14A and 14B, the Al-thickened layer is finer in crystal grains than the internal layer portion. As estimated from the image of FIG. 14A, the average grain size of crystal grains (main phase) of the internal layer portion is approximately 0.36 μm, and the maximum grain size is approximately 5 μm. As estimated from the image of FIG. 14B, the average grain size of crystal grains (main phase) of the Al-thickened layer is approximately 0.28 μm, and the maximum grain size is approximately 2.5 μm.

If the Al component is present in the form of $Al_2O_3$ in the Al-thickened layer, corresponding thickening of the oxygen component must be observed in the layer. However, as seen from comparison of FIGS. 13A and 13B, such thickening of oxygen is not observed. The present inventors studied the detailed distribution of the oxygen concentration by line analysis which was carried out by means of EPMA, and found that the oxygen concentration of the Al-thickened layer is rather lower than that of the internal layer portion. This implies that the Al component is present in the form of an inorganic compound other than $Al_2O_3$.

Figure 15:
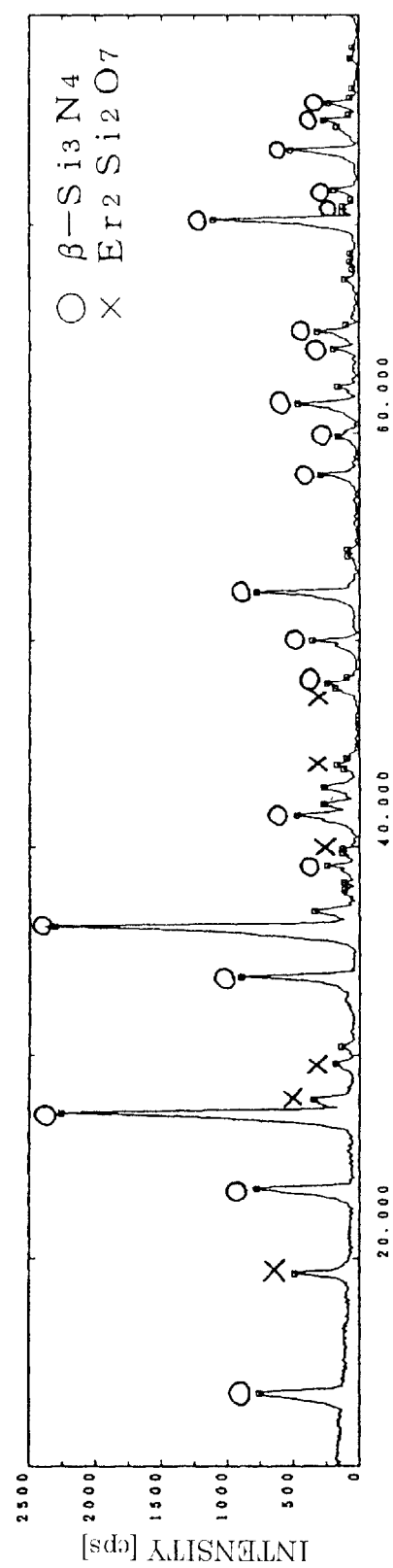
FIG. 15 is a profile obtained through X-ray diffractometry of the surface layer portion of the sample.

FIG. 15 shows diffraction patterns obtained by X-ray diffractometry conducted as follows: the $K\alpha 1$ ray (wavelength: approx. 1.54 angstroms) of Cu is caused to impinge on the surface of the ceramic substrate. As seen from FIG. 15, crystals of a composite oxide with Er and Si are present in addition to $\beta$-$Si_3N_4$, which is the main phase.

The ceramic heater samples were polished such that the ceramic substrate assumes a diameter of 3.50 mm (arithmetic average roughness of polished surface: 0.1 μm) and were then subjected to a 3-point bending test (span length: 12 mm; crosshead speed: 0.5 mm/min) at room temperature (number of samples N=10) as well as at 1400° C. (number of samples N=5). In the case of Sample No. 9, even after polishing, the Al-thickened layer remained by an average thickness of approximately 280 μm. The test results are shown in Table 1.

TABLE 1

| Sample No. | Sintering Aid | Composition (mol %) | | | | Bending Strength (MPa) (Minimum/Average) | |
|---|---|---|---|---|---|---|---|
| | | SN | $RE_2O_3$ | $SiO_2$ | $Al_2O_3$ | Room Temp. (N = 10) | 1400° C. (N = 5) |
| 1 | $Al_2O_3$—$Y_2O_3$ | 90 | $2Y_2O_3$ | | $8Al_2O_3$ | 1143/1212 | 251/320 |
| 2 | $Al_2O_3$—$Y_2O_3$ | 90 | $4Y_2O_3$ | | $4Al_2O_3$ | 1125/1191 | 270/335 |
| 3 | $Er_2O_3$—$SiO_2$ | 92 | $3Er_2O_3$ | $5SiO_2$ | — | 1010/1164 | 661/739 |
| 4 | $Er_2O_3$—$SiO_2$ | 90 | $3Er_2O_3$ | $7SiO_2$ | — | 982/1189 | 640/725 |
| 5 | $Er_2O_3$—$SiO_2$ | 83 | $5Er_2O_3$ | $7SiO_2$ | — | 1053/1205 | 647/711 |
| 6 | $Er_2O_3$—$SiO_2$—$Al_2O_3$ | 91.5 | $3Er_2O_3$ | $7SiO_2$ | $0.5Al_2O_3$ | 1083/1213 | 492/545 |
| 7 | $Er_2O_3$—$SiO_2$—$Al_2O_3$ | 91 | $3Er_2O_3$ | $7SiO_2$ | $1Al_2O_3$ | 1177/1241 | 416/481 |
| 8 | $Er_2O_3$—$SiO_2$—$Al_2O_3$ | 90 | $3Er_2O_3$ | $7SiO_2$ | $2Al_2O_3$ | 1165/1228 | 385/457 |
| 9 | $Er_2O_3$—$SiO_2$ + Al-thickened layer | 92 | $3Er_2O_3$ | $7SiO_2$ | Al-thickened layer | 1202/1248 | 652/731 |

The test results shown in Table 1 reveal the following. Samples using an $Al_2O_3$—$Y_2O_3$-type sintering aid (Nos. 1 and 2) show a significant impairment in high temperature strength as measured at 1400° C. In the case of samples using an $Er_2O_3$—$SiO_2$-type sintering aid (Nos. 3 to 5), the minimum room temperature strength is low, and variation in room temperature strength is great In the case of samples using an $Er_2O_3$—$SiO_2$—$Al_2O_3$-type sintering aid (Nos. 6 to 8), variation in room temperature strength is minor, but high temperature strength is rather low. In the case of Sample No. 9, which falls within the scope of the present invention, high temperature strength is sufficiently high, and variation in room temperature strength is minor.

Obviously, numerous modifications and variations of the present invention are possible in light of the above teachings. It is therefore to be understood that within the scope of the appended claims, the present invention may be practiced otherwise than as specifically described herein.

What is claimed is:

1. A ceramic heater comprising:

a silicon nitride ceramic substrate having a surface layer portion and an internal layer portion, said silicon nitride ceramic substrate containing a rare-earth component serving as a sintering-aid component and said rare-earth component being present in the form of a composite oxide with silicon;

a resistance heating member embedded in said silicon nitride ceramic substrate, and an Al-thickened layer having a thickness of 50 $\mu$m to 1000 $\mu$m and formed in said surface layer portion of said silicon nitride ceramic substrate, wherein said Al-thickened layer has an average Al concentration of 0.1% to 5% by weight and higher than that of said internal layer portion of said silicon nitride ceramic substrate, and said composite oxide is contained in the form of $R_2SiO_5$, where R is said rare-earth component.

2. The ceramic heater according to claim 1, wherein the Al concentration increases toward a surface of said silicon nitride ceramic substrate.

3. The ceramic heater according to claim 1, wherein the average grain size of a silicon nitride main phase in said Al-thickened layer is smaller than that of the silicon nitride main phase in said internal layer portion.

4. The ceramic heater according to claim 3, wherein an average grain size of said silicon nitride main phase in the Al-thickened layer is 0.1 $\mu$m to 1 $\mu$m, and an average grain size of said silicon nitride main phase in said internal layer portion is 0.2 $\mu$m to 5 $\mu$m.

5. The ceramic heater according to claim 1, wherein said Al component in said silicon nitride ceramic substrate is present predominantly in the form of an inorganic compound other than $Al_2O_3$.

6. The ceramic heater according to claim 1, wherein the rare-earth component content of said silicon nitride ceramic substrate is 3% to 15% by weight.

7. A ceramic heater comprising:

a silicon nitride ceramic substrate having a surface layer portion and an internal layer portion said silicon nitride ceramic substrate containing a rare-earth component serving as a sintering-aid component and said rare-earth component being present in the form of a composite oxide with silicon;

a resistance heating member embedded in said silicon nitride ceramic substrate, and an Al-thickened layer having a thickness of 50 $\mu$m to 1000 $\mu$m and formed in said surface layer portion of said silicon nitride ceramic substrate, wherein said Al-thickened layer has an Al concentration higher than that of said internal layer portion of said silicon nitride ceramic substrate and said composite oxide is contained in the form of $R_2Si_2O_7$, where R is said rare-earth component.

8. The ceramic heater according to claim 7, wherein the Al concentration increases toward a surface of said silicon nitride ceramic substrate.

9. A ceramic heater comprising:

a silicon nitride ceramic substrate having a surface layer portion and an internal layer portion said silicon nitride ceramic substrate containing a rare-earth component serving as a sintering-aid component and said rare-earth component being present in the form of a composite oxide with silicon;

a resistance heating member embedded in said silicon nitride ceramic substrate, and an Al-thickened layer having a thickness of 50 $\mu$m to 1000 $\mu$m and formed in said surface layer portion of said silicon nitride ceramic substrate, wherein said Al-thickened layer has an Al concentration higher than that of said internal layer portion of said silicon nitride ceramic substrate, and an average grain size of a silicon nitride main phase in said Al-thickened layer is smaller than that of the silicon nitride main phase in said internal layer portion.

10. The ceramic heater according to claim 9, wherein an average grain size of said silicon nitride main phase in the Al-thickened layer is 0.1 $\mu$m to 1 $\mu$m, and an average grain size of said silicon nitride main phase in said internal layer portion is 0.2 $\mu$m to 5 $\mu$m.

* * * * *